(12) United States Patent
Rao et al.

(10) Patent No.: US 11,762,058 B2
(45) Date of Patent: Sep. 19, 2023

(54) PULSED RADAR SYSTEM AND METHOD WITH DIGITAL MIXER FOR FREQUENCY HOPPING

(71) Applicant: Signalchip Innovations Private Limited, Bangalore (IN)

(72) Inventors: Nikhil Birur Gururaja Rao, Bangalore (IN); Himamshu Gopalakrishna Khasnis, Bangalore (IN)

(73) Assignee: SIGNALCHIP INNOVATIONS PRIVATE LIMITED, Bangalore (IN)

( * ) Notice: Subject to any disclaimer, the term of this patent is extended or adjusted under 35 U.S.C. 154(b) by 0 days.

(21) Appl. No.: 17/466,290

(22) Filed: Sep. 3, 2021

(65) Prior Publication Data

US 2022/0065985 A1 Mar. 3, 2022

(30) Foreign Application Priority Data

Sep. 3, 2020 (IN) .............................. 202041037957

(51) Int. Cl.
*G01S 7/288* (2006.01)
*G01S 13/26* (2006.01)
*G01S 7/282* (2006.01)

(52) U.S. Cl.
CPC ............ *G01S 7/2886* (2021.05); *G01S 7/282* (2013.01); *G01S 13/26* (2013.01)

(58) Field of Classification Search
CPC ......... G01S 7/2886; G01S 7/282; G01S 13/26
See application file for complete search history.

(56) References Cited

U.S. PATENT DOCUMENTS

| 8,363,695 B2 * | 1/2013 | Mochizuki | H04L 25/06 375/136 |
| 10,698,095 B1 * | 6/2020 | Peral | G01S 13/0209 |
| 2006/0256910 A1 * | 11/2006 | Tal | H04B 1/71635 375/135 |
| 2006/0279446 A1 * | 12/2006 | Wang | H04B 1/28 341/155 |
| 2007/0189361 A1 * | 8/2007 | Sugiyama | H04B 1/7136 375/E1.034 |

* cited by examiner

*Primary Examiner* — Timothy A Brainard
*Assistant Examiner* — Kenneth W Good

(57) ABSTRACT

A radar system for generating a fast frequency hopping output for frequency agility using a transmitter block and a receiver block. The transmitter block is configured to (i) modulate a digital signal using a first digital mixer, (ii) convert a modulated signal into an inphase analog signal and provide the inphase analog signal to at least one of a first RF IQ mixer or a third RF IQ mixer, (iii) convert the modulated signal into a quadrature analog signal provide the quadrature analog signal to at least one of the first RF IQ mixer or the third RF IQ mixer, and (iv) generate the fast frequency hopping output radar signal by mixing the inphase analog signal and the quadrature analog signal with an inphase RF local oscillator signal and a quadrature RF local oscillator signal.

8 Claims, 5 Drawing Sheets

PULSED RADAR SYSTEM AND METHOD WITH DIGITAL MIXER FOR FREQUENCY HOPPING

CROSS-REFERENCE TO RELATED APPLICATIONS

This application claims priority to Indian provisional patent application no. 202041037957 filed on Sep. 3, 2020, the complete disclosure of which, in their entirety, is herein incorporated by reference.

BACKGROUND

Technical Field

The embodiments herein generally relate to pulse radar, and more particularly, to a radar system and a method for implementing a fast frequency hopping output for frequency agility using digital and analog mixer methods.

Description of the Related Art

Radars are generally known to use systems for determining the distance or range from the radar system to moving or stationary target objects, and/or for determining the velocity or the relative velocity of such target objects. The radar systems are typically adapted for use in different distance ranges. Pulse radars emit short and powerful pulses and in the silent period receives the echo signals. In contrast to continuous wave radars, the transmitter is turned off before the measurement is finished. The pulse radars require a technology that solves the frequency agility requirement of radar signals. A frequency-hopping spread spectrum (FHSS) is a method of transmitting radio signals by rapidly changing the carrier frequency among many distinct frequencies occupying a large spectral band. The frequency-hopping spread spectrum (FHSS) needs a complex frequency synthesizer and error correction before sending the signal.

Therefore, there arises a need to address the technical drawbacks in existing technologies to overcome signal blocks and interferences.

SUMMARY

Embodiments herein provide a radar system for generating a fast frequency hopping radar signal. The radar system includes a transmitter block and a receiver block. The transmitter block includes a first digital mixer, an inphase Digital to Analog converter (DAC), a quadrature Digital to Analog Converter (DAC), a third RF IQ mixer, a power amplifier and a first RF IQ mixer. The receiver block includes an antenna, a low noise amplifier, a second RF IQ mixer, an inphase receive filter, a quadrature receive filter, an inphase Analog to Digital Converter (ADC), a quadrature Analog to Digital Converter (ADC), and a second digital mixer. The transmitter block generates the fast frequency hopping output radar signal using digital and analog mixer methods. The transmitter block is configured to (i) modulate the digital signal using the first digital mixer, (ii) convert the modulated signal into an inphase analog signal and provide the inphase analog signal to at least one of the first RF IQ mixer or the third RF IQ mixer, (iii) convert the modulated signal into a quadrature analog signal provide the quadrature analog signal to at least one of the first RF IQ mixer or the third RF IQ mixer, and (iv) generate the fast frequency hopping output radar signal by mixing the inphase analog signal and the quadrature analog signal with an inphase RF local oscillator signal and a quadrature RF local oscillator signal. The mixed analog RF signal is provided to a local oscillator port of a second RF IQ mixer as a quadrature local oscillator signal. The fast frequency hopping output radar signal is provided to the power amplifier to amplify the fast frequency hopping output radar signal to increase the magnitude of the fast frequency hopping output radar signal. The generated fast frequency hopping output radar signal is provided to the local oscillator port of the second RF IQ mixer as an inphase local oscillator signal.

In some embodiments, the receiver block is configured to (i) receive the reflected radar signal, (ii) amplify a received radar signal, (iii) mix the radar signal with an output of the first RF IQ mixer and the third RF IQ mixer, to obtain down-convert signal at a baseband frequency, (iv) filter a down converted signal, (v) convert a filtered signal into an inphase digital signal, (vi) convert a filtered signal into a quadrature digital signal and (vii) demodulate the digital in-phase signal and the digital quadrature signal into the digital data.

In some embodiments, the power amplifier in the transmitter block is powered OFF when the receiver block is power ON. The power amplifier in the transmitter block is power ON when the receiver block is power OFF. The power amplifier receives a signal from at least one of the first RF IQ mixer or the third RF IQ mixer and the output of the power amplifier is provided as the inphase local oscillator signal to the second RF IQ mixer.

In some embodiments, the transmitter block includes the third RF IQ mixer (238) that generates a mixed analog RF signal by mixing a 180 degree phase shifted inphase RF local oscillator signal and a quadrature RF local oscillator signal with the inphase analog signal and the quadrature analog signal from the inphase digital to analog converter and the quadrature digital to analog converter. The mixed analog RF signal is provided to a second RF IQ mixer as a quadrature local oscillator signal.

In some embodiments, the receiver block directly receives the fast frequency hopping output radar signal using the second RF IQ mixer without the signal getting amplified by the low noise amplifier.

In some embodiments, an input local oscillator frequency to the second RF IQ mixer during a receive operation is at an offset to the local oscillator frequency to the first RF IQ mixer.

In some embodiments, the radar system includes an in-phase transmit filter and a quadrature transmit filter.

The inphase transmit filter filters the inphase analog signal received from the inphase digital to analog converter. The quadrature transmit filter filters the quadrature analog signal received from the inphase digital to analog converter.

In some embodiments, a band-pass filter is placed before the low noise amplifier to filter out unwanted RF signals from the signals received at the antenna.

In one aspect, a method for generating a fast frequency hopping output radar signal is provided. The method includes (i) modulating a digital signal, (ii) converting the modulated signal into an inphase analog signal and provide the inphase analog signal to at least one of a first RF IQ mixer or a third RF IQ mixer, (iii) converting the modulated signal into a quadrature analog signal and provide the quadrature analog signal to at least one of the first RF IQ mixer or the third RF IQ mixer, and (iv) generating the fast frequency hopping output radar signal by mixing the inphase analog signal and the quadrature analog signal with the inphase RF local oscillator signal and the quadrature RF local oscillator signal. The fast frequency hopping output radar signal is provided to a power amplifier to amplify the fast frequency hopping output radar signal to increase the magnitude of the fast frequency hopping output radar signal. The generated fast frequency hopping output radar signal is provided to the local oscillator port of the second RF IQ mixer as an inphase local oscillator signal.

In some embodiments, the method includes (i) receiving a reflected radar signal using, (ii) amplifying a received radar signal, (iii) mixing an amplified radar signal with an output of the first RF IQ mixer and the third RF IQ mixer to obtain a down converted signal at a baseband frequency, (iv) filtering a down converted signal, (v) converting a filtered radar signal into an inphase digital signal, (vi) converting a filtered signal into a quadrature digital signal and (vii) demodulating, using a second digital mixer the digital inphase signal and the digital quadrature signal into the digital data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
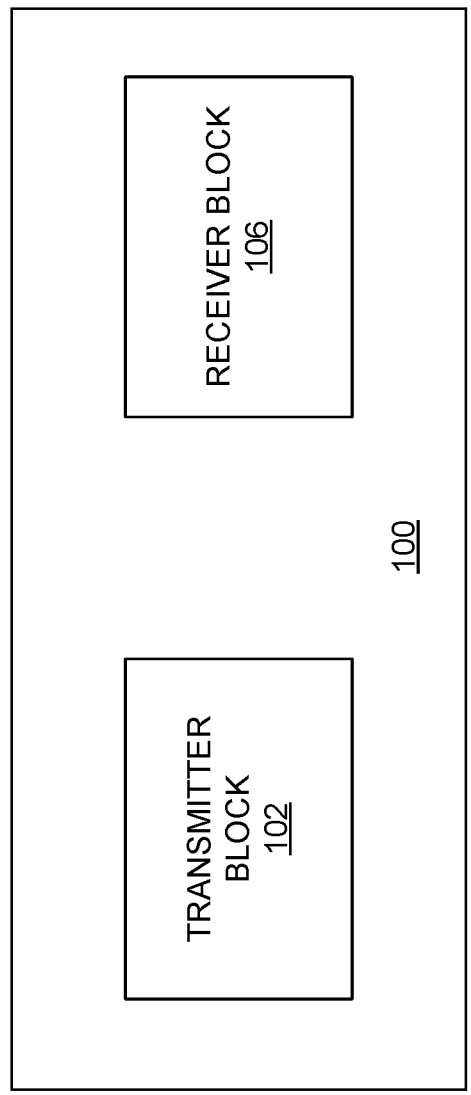
FIG. 1 is a block diagram that illustrates a radar system for generating a fast frequency hopping output radar signal for frequency agility using digital and analog mixer methods according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system to generate a fast frequency hopping output for frequency agility. Frequency agility is necessary to prevent the radar signals from getting jammed. Referring now to the drawings, and more particularly to FIGS. 1 through 4B, where similar reference characters denote corresponding features consistently throughout the figures, there are shown preferred embodiments.

FIG. 1 is a block diagram that illustrates a radar system 100 for generating a fast frequency hopping output radar signal for frequency agility using digital and analog mixer methods according to some embodiments herein. The radar system 100 includes a transmitter block 102 and a receiver block 106. The radar system 100 includes local oscillators that are connected with at least one of the transmitter block 102 or the receiver block 106. The radar system 100 generates digital data to transmit. The transmitter block 102 converts the digital data into at least one of an inphase analog signal and a quadrature analog signal.

The receiver block 106 receives a reflected radar signal using a low noise amplifier that is connected to an antenna. The low noise amplifier amplifies a received fast frequency hopping output radar signal. The receiver block 106 mixes the amplified fast frequency hopping output radar signal with an output of RF IQ mixers that are located in the transmitter block 102. In some embodiments, the frequency hopping is achieved using one or more digital mixers in the radar system 100. In some embodiments, the frequency hopping is a method that rapidly switches transmitting radio signals among several frequency channels. The receiver block 106 mixes an amplified radar signal with an output of the first RF IQ mixer and the third RF IQ mixer to obtain a down-converted signal at a baseband frequency. The filtered mixed signal is converted into the digital data and the digital data is demodulated by the receiver block 106.

A modulated digital data is converted into an inphase analog signal and a quadrature analog signal. The RF IQ mixer mixes the inphase analog signal and the quadrature analog signal for up-converting the inphase analog signal and the quadrature analog signal to RF frequencies for transmission on air using the antenna. In some embodiments, the radar system 100 performs the transmit operation and the receive operation at different times. In some embodiments, the radar system 100 includes a Phase Locked Loop circuit that provides an inphase local RF oscillator and a quadrature local RF oscillator.

In some embodiments, a power amplifier that is switched off during the receive operation. The local oscillator signals are used for down-converting the signal to baseband frequencies. In some embodiments, a first digital mixer is programmed to an offset frequency during the receive operation. The radar system 100 includes extra circuitry to generate in-phase and quadrature clocks for RF IQ mixers. In some embodiments, an offset is introduced in a frequency during the receive operation and the output of the receiver block 106 after digitization in the analog to digital converter is at an intermediate frequency. In some embodiments, a second digital mixer in the radar system 100 reduces noise specifications of a received radar signal. The radar system 100 provides a good noise performance of the receiver block 106 using the offset down conversion frequency and the digital mixers.

Figure 2:
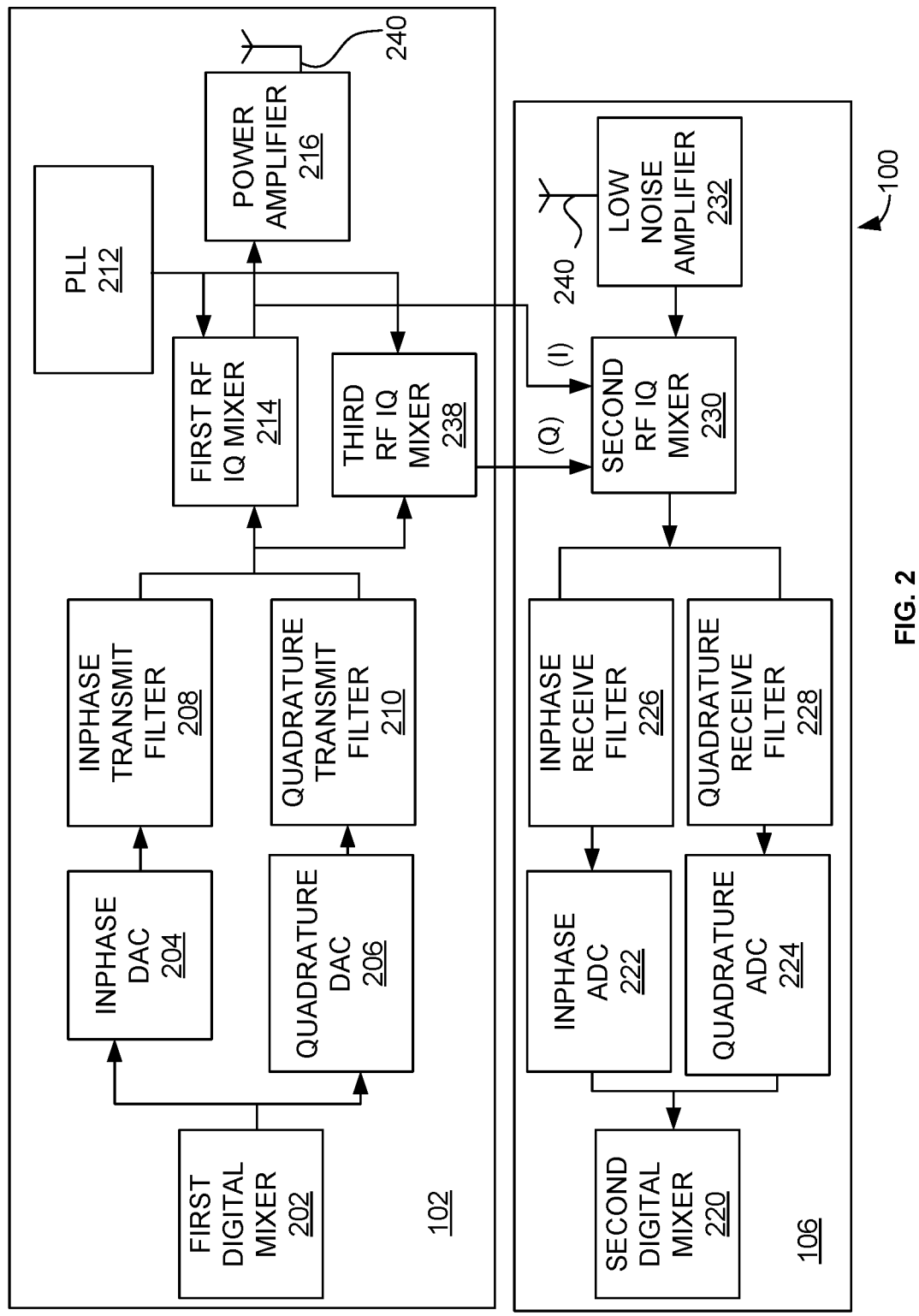
FIG. 2 is an exemplary exploded diagram of the radio system to generate the fast frequency hopping output radar signal for frequency agility according to some embodiments herein.

FIG. 2 is an exemplary exploded diagram of the radio system 100 to generate the fast frequency hopping output radar signal for frequency agility u according to some embodiments herein. The radar system 100 includes the transmitter block 102 and the receiver block 106. The transmitter block 102 includes a first digital mixer 202, an inphase digital to analog converter (DAC) 204, a quadrature digital to analog converter (DAC) 206, a first RF IQ mixer 214, a power amplifier 216, a third RF IQ mixer 238 and a Phase Locked Loop (PLL) circuit 212. The phase locked loop circuit 212 and its related circuitry generates the inphase RF local oscillator signal and a quadrature RF local oscillator signal. The receiving block 106 includes a second digital mixer 220, an inphase analog to digital converter (ADC) 222, a quadrature analog to digital converter (ADC) 224, an inphase receive filter 226, a quadrature receive filter 228, a second RF IQ mixer 230 and a low noise amplifier 232. The first digital mixer 202 generates a digital signal for a received digital data from at least one of user or external devices. In some embodiments, the first digital mixer 202 mixes the digital data with an inphase and quadrature sine tone to generate a modulated digital signal. The in-phase digital to analog converter (DAC) 204 receives the modulated digital signal from the first digital mixer 202 and converts the modulated digital signal into an inphase analog signal. The quadrature digital to analog converter (DAC) 206 receives the modulated digital signal from the first digital mixer 202 for converting the modulated digital signal into a quadrature analog signal.

The output from the inphase digital to analog converter (DAC) 204 is filtered using the inphase transmit filter 208. The output from the quadrature digital to analog converter (DAC) 206 is filtered using the quadrature transmit filter 210. The filtered output from the inphase transmit filter 208 and the quadrature transmit filter Q 210 is mixed with a 180 degrees phase shifted inphase RF local oscillator signal and a quadrature RF local oscillator signal using the third RF IQ mixer 238 to generate a mixed analog RF signal. The first RF IQ mixer 214 generates the fast frequency hopping output radar signal by mixing the inphase analog signal and the quadrature analog signal with the inphase RF local oscillator signal and the quadrature RF local oscillator signal. The first RF IQ mixer 214 converts the mixed analog signal into RF frequencies. The output from the first RF IQ mixer 214 is provided to the power amplifier 216 to amplify the first RF frequency to increase the magnitude of the analog signal. The fast frequency hopping output radar signal from the first RF IQ mixer 214 is provided to the local oscillator port of the second RF IQ mixer 230 as an inphase local oscillator signal. In some embodiments, the power amplifier 216 in the transmitter block 102 is power OFF when the receiver block 106 is power ON. In some embodiments, the power amplifier 216 in the transmitter block 102 is power ON when the receiver block 106 is power OFF. The output of the first RF IQ mixer 214 drives an input port of the second RF IQ mixer 230.

The receiver block 106 receives the reflected radar signal using an antenna 240 and amplifies using the low noise amplifier 232. In some embodiments, the second RF IQ mixer 230 mixes the amplified radar signal with an output of the first RF IQ mixer 214 and the third RF IQ mixer 238. In some embodiments, the second RF IQ mixer 230 down converts the signal to baseband frequencies. In some embodiments, the second RF IQ mixer 230 is fed local oscillator signals at an offset frequency compared to the frequency used during transmission to keep the noise at the RF PLL frequency out of the receiver band to reduce noise specification of blocks down a receiver chain from the receiver second RF IQ mixer 230.

The output from the second RF IQ mixer 230 is filtered using the inphase receive filter 226 and using the quadrature receive filter 228. The inphase analog to digital converter (ADC) 222 receives the filtered inphase analog signal from the inphase receive filter 226 for converting the inphase analog signal into inphase digital signal. The quadrature analog to digital converter (ADC) 224 receives the filtered quadrature analog signal from the quadrature receive filter 228 for converting the quadrature analog signal into quadrature digital signal.

The output from the second RF IQ mixer 230 is filtered using the inphase receive filter 226 and using the quadrature receive filter 228. The inphase analog to digital converter (ADC) 222 receives the inphase analog signal from the second RF IQ mixer 230 for converting the inphase analog signal into inphase digital signal. The quadrature analog to digital converter (ADC) 224 receives the quadrature analog signal from the second RF IQ mixer 230 for converting the quadrature analog signal into the quadrature digital signal. The second digital mixer 220 receives the input from the inphase analog to digital converter (ADC) 222 and quadrature analog to digital converter (ADC) 224 and demodulates the digital signal. In some embodiments, the second digital mixer 220 demodulates the inphase and quadrature digital signal. In some embodiments, the receiver block 106 directly receives the reflected radar signal using the second RF IQ mixer 230. In some embodiments, an input local oscillator frequency to the second RF IQ mixer 230 is at an offset to the local oscillator frequency to the first RF IQ mixer 214. In some embodiments, a band-pass filter is placed before the low noise amplifier 232 to filter out unwanted RF signals. In some embodiments, a voltage to current converter is placed in between the low noise amplifier 232 and a received RF IQ mixer 230.

Figure 3:
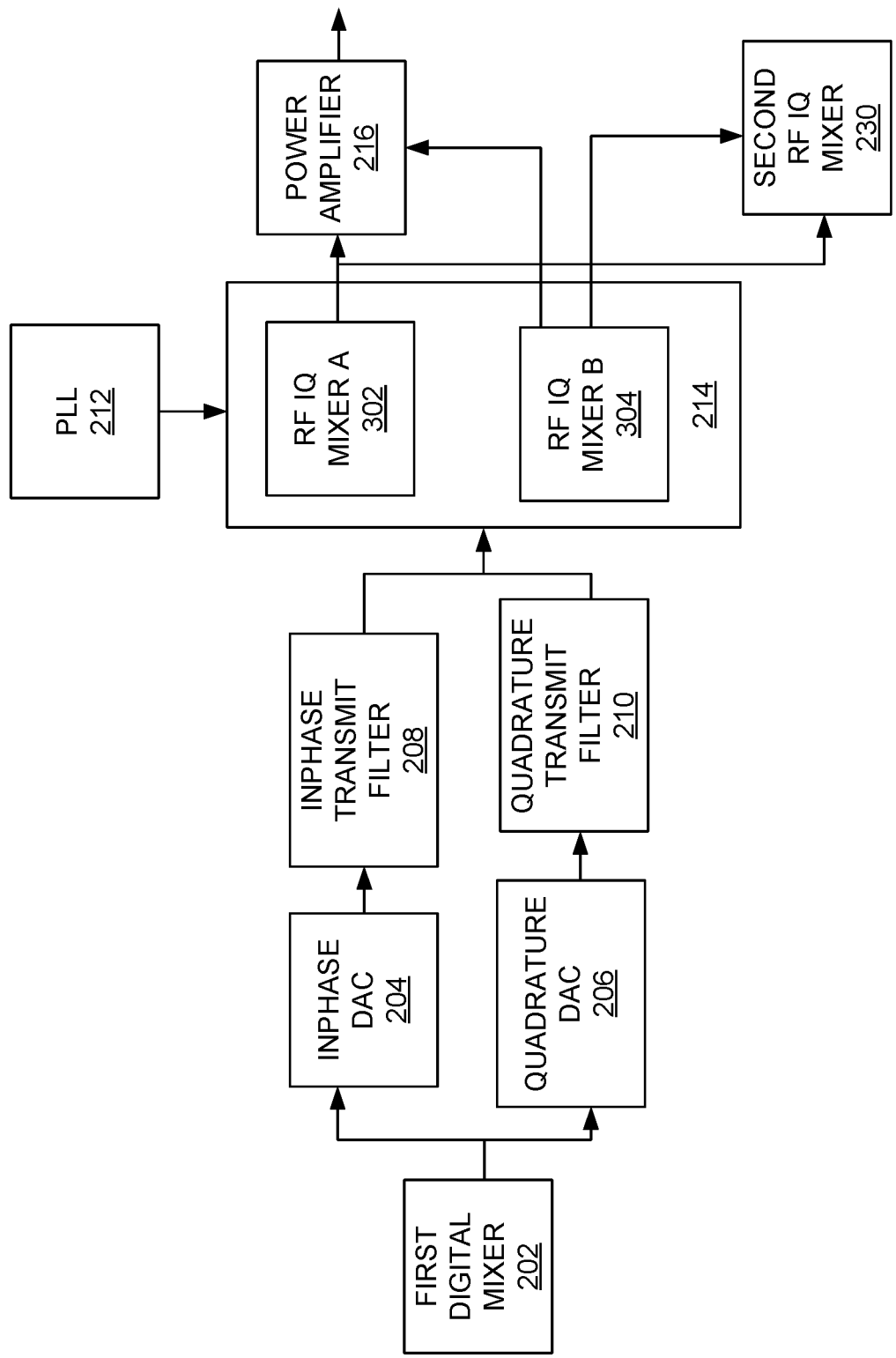
FIG. 3 is an exemplary exploded diagram of the radio system to upshift frequency of the transmitting signal and down shift the frequency of a received signal using the RF IQ mixers of FIG. 1 according to some embodiments herein.

FIG. 3 is an exemplary exploded diagram of the radio system to upshift frequency of the transmitting signal and down shift the frequency of a received signal using RF IQ mixers of FIG. 1 according to some embodiments herein. The first RF IQ mixer 214 includes a RF IQ mixer A 302 and a RF IQ mixer B 304. An output from the inphase transmit filter 208 is provided to the RF IQ mixer A 302 and RF IQ mixer B 304. The output from the quadrature transmit filter 210 is provided to the RF IQ mixer A 302 and RF IQ mixer B 304. A clock signal from the phase locked loop (PLL) circuit 212 is provided to the first RF IQ mixer 214. The RF IQ mixer A 302 mixes an output signal from the inphase transmit filter 208, the quadrature transmit filter 210, and a clock signal received from the phase locked loop circuit 212. An output of the RF IQ mixer A 302 is transmitted to the power amplifier 216.

The RF IQ mixer B 304 mixes the output signal from the inphase transmit filter 204 the quadrature transmit filter 208 and the clock signal received from the phase locked loop circuit 212. An output of the RF IQ mixer B 304 is transmitted to the second RF IQ mixer 230 as a local oscillator signal. In some embodiments, the power amplifier 216 amplifies the output of the first RF IQ mixer 214. In some embodiments, an output of the RF IQ mixer B 304 is provided to the power amplifier 216 instead of output of the RF IQ mixer A 302. In some embodiments, the RF signal at the output of the power amplifier 216 is provided to the antenna 240 for transmitting the RF signal. The second RF IQ mixer 230 receives the RF signal using the antenna 240. The second RF IQ mixer 230 down shifts the RF signal frequency. In some embodiments, the second RF IQ mixer 230 down shifts the RF signal frequency based on the local oscillator signal. In some embodiments, down shift frequency is low frequency.

Figure 4A:
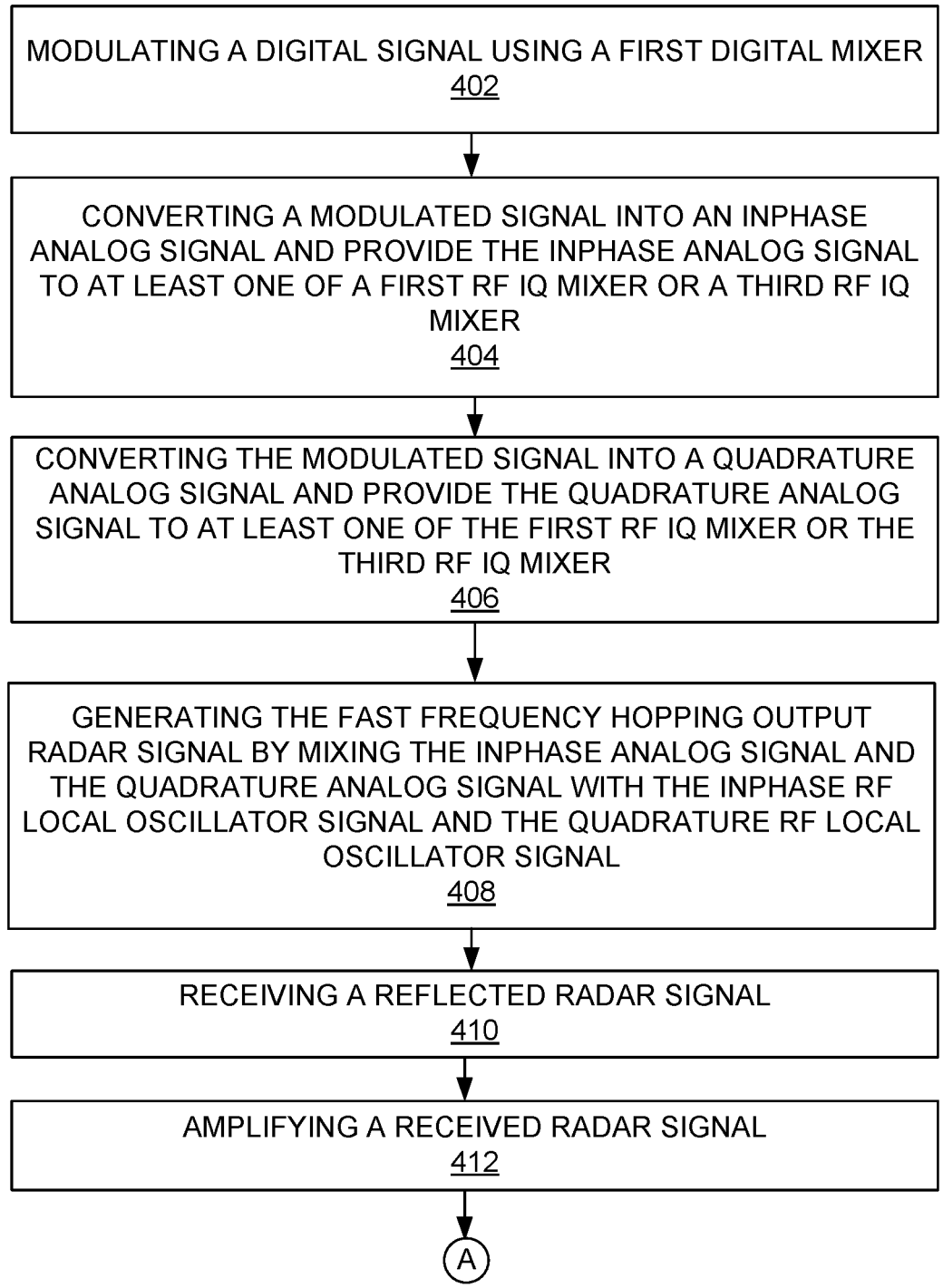
FIGS. 4A and 4B are flow diagrams that illustrate a method of implementing a fast frequency hopping output radar signal for frequency agility using digital and analog mixer methods according to some embodiments herein.
Figure 4B:
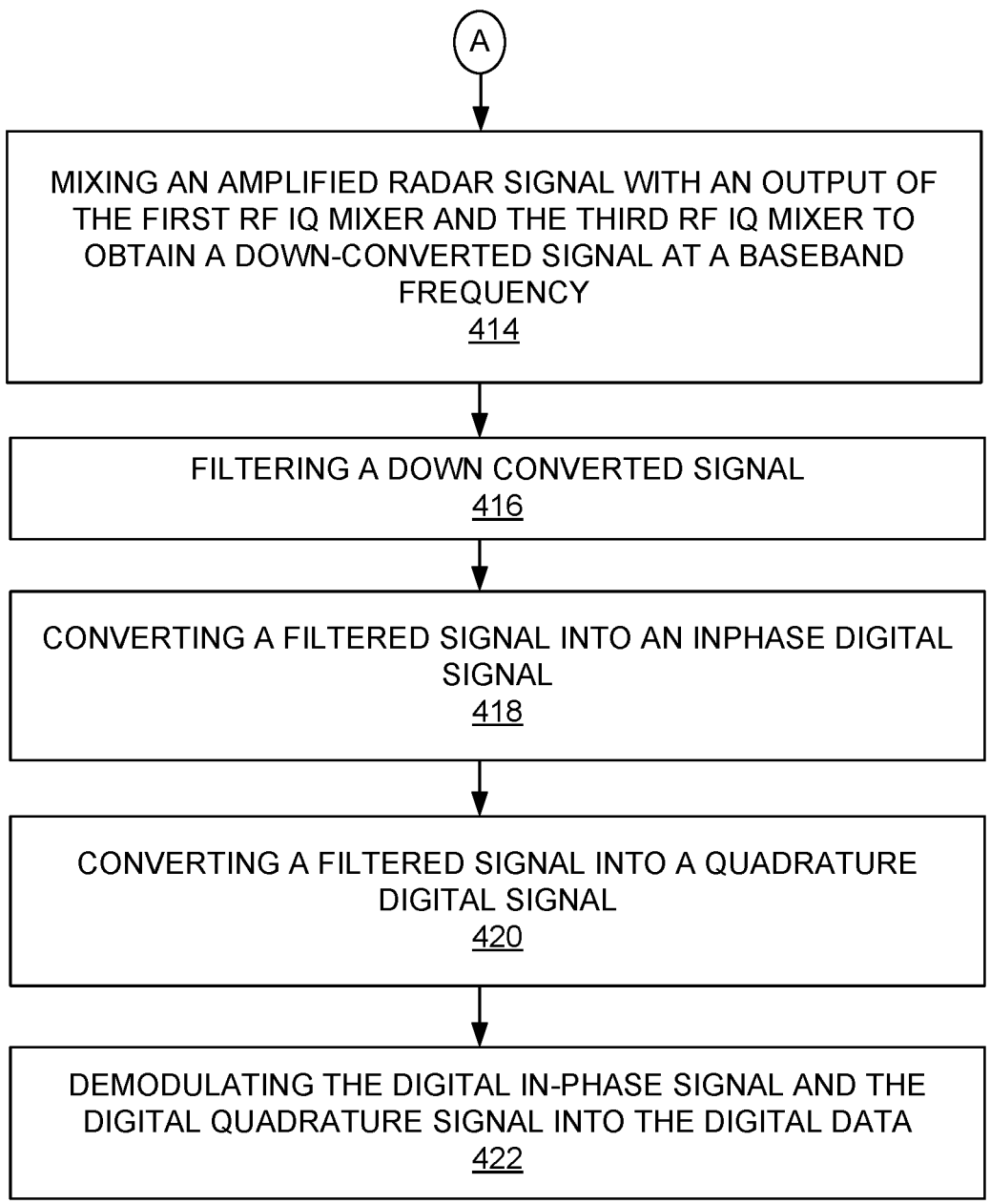

FIGS. 4A and 4B are flow diagrams that illustrate a method of implementing a fast frequency hopping output radar signal for frequency agility using digital and analog mixer methods of FIG. 2 according to some embodiments herein. At step 402, a digital signal is modulated using the first digital mixer 202. At step 404, a modulated signal is converted into an inphase analog signal using the inphase digital to analog converter (DAC) 204. At step 406, the modulated signal is converted into a quadrature analog signal using the quadrature digital to analog converter (DAC) 206. At step 408, generating the fast frequency hopping output radar signal by mixing the inphase analog signal and the quadrature analog signal with the inphase RF local oscillator signal and the quadrature RF local oscillator signal using the first RF IQ mixer 214. The fast frequency hopping output radar signal is provided to a power amplifier 216 to amplify the fast frequency hopping output radar signal to increase the magnitude of the mixed analog RF signal. In some embodiments, 180 degree phase shifted inphase RF local oscillator signal and a quadrature RF local oscillator signal are mixed with the inphase analog signal and the quadrature analog signal from the inphase digital to analog converter 204 and the quadrature digital to analog converter to be used as the quadrature local oscillator signal for the third RF IQ mixer 238.

At step 410, a reflected radar signal is received using the antenna 240. At step 412, a received radar signal is amplified using the low noise amplifier 232. At step 414, an amplified radar signal is mixed with an output of the first RF IQ mixer 214 and the third RF IQ mixer 238 to obtain a down-converted signal at a baseband frequency. At step 416, a down converted signal is filtered. At step 418, a filtered signal is converted into an inphase digital signal. At step 420, a filtered radar signal is converted into a quadrature digital signal. At step 422, the digital inphase signal and the digital quadrature signal are demodulated into the digital data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A radar system for implementing a fast frequency hopping output radar signal as an inphase local oscillator signal for a local oscillator port of a receive RF IQ mixer and for wireless transmission, comprising:
    a transmitter block that comprises
        a first digital mixer that generates a digital signal for (i) the wireless transmission and (ii) demodulating a received radar signal and mixes the digital signal with an inphase and quadrature sine tone to generate a modulated digital signal;
        an inphase digital to analog converter (DAC) that converts the modulated digital signal into an inphase analog signal and provide the inphase analog signal to at least one of a first RF IQ mixer or a third RF IQ mixer;
        a quadrature digital to analog converter (DAC) that converts the modulated signal into a quadrature analog signal and provide the quadrature analog signal to at least one of the first RF IQ mixer or the third RF IQ mixer,
        wherein the first RF IQ mixer generates the fast frequency hopping output radar signal by mixing the inphase analog signal and the quadrature analog signal with an inphase RF local oscillator signal and a quadrature RF local oscillator signal for up-converting the inphase analog signal and the quadrature analog signal to RF frequencies, wherein the fast frequency hopping output radar signal is provided to a power amplifier to amplify the fast frequency hopping output radar signal to increase the magnitude of the fast frequency hopping output radar signal for wireless transmission using an antenna, wherein the fast frequency hopping output radar signal is provided to the local oscillator port of a second RF IQ mixer as the inphase local oscillator signal, wherein the receive RF IQ mixer is the second RF IQ mixer; and
        a third RF IQ mixer that generates a mixed analog RF signal by mixing a 180 degree phase shifted inphase RF local oscillator signal and a quadrature RF local oscillator signal with the inphase analog signal and the quadrature analog signal from the inphase digital to analog converter and the quadrature digital to analog converter, wherein the mixed analog RF signal is provided to the second RF IQ mixer.

2. The radar system of claim 1, further comprises a receiver block that comprises
    the antenna that receives a reflected radar signal;
    a low noise amplifier that amplifies the received radar signal;
    the second RF IQ mixer mixes the amplified received radar signal with an output of the first RF IQ mixer and the third RF IQ mixer to obtain a down-converted signal at a baseband frequency;
    an inphase receive filter and a quadrature receive filter that filters a down converted signal;
    an inphase analog to digital converter (ADC) that converts a filtered signal into an inphase digital signal;
    a quadrature analog to digital converter (ADC) that converts a filtered radar signal into a quadrature digital signal; and
    a second digital mixer that demodulates the digital inphase signal and the digital quadrature signal into the digital data.

3. The radar system of claim 1, wherein the power amplifier is powered OFF when the receiver block is powered ON, wherein the power amplifier in the transmitter block is powered ON when the receiver block is powered OFF, wherein the power amplifier receives a signal from at least one of the first RF IQ mixer or the third RF IQ mixer and the output of power amplifier is provided as the inphase local oscillator signal to the second RF IQ mixer.

4. The radar system of claim 1, wherein the receiver block directly receives the reflected radar signal using the second RF IQ mixer without the signal getting amplified by the low noise amplifier.

5. The radar system of claim 1, wherein an input local oscillator frequency to the second RF IQ mixer during a receive operation is at an offset to the local oscillator frequency to the first RF IQ mixer.

6. The radar system of claim 1, further comprises
an inphase transmit filter that filters the inphase analog signal received from the inphase digital to analog converter; and
a quadrature transmit filter that filters the quadrature analog signal received from the inphase digital to analog converter.

7. A method for implementing a fast frequency hopping output radar signal as an inphase local oscillator signal for a local oscillator port of a receive RF IQ mixer and for wireless transmission, comprising:
generating, using a first digital mixer, a digital signal for (i) the wireless transmission and (ii) demodulating a received radar signal and mixing the digital signal with an inphase and quadrature sine tone to generate a modulated digital signal;
converting, using an inphase digital to analog converter (DAC) of the transmitter block, the modulated signal into an inphase analog signal and provide the inphase analog signal to at least one of a first RF IQ mixer or a third RF IQ mixer;
converting, using a quadrature digital to analog converter (DAC) of the transmitter block, the modulated signal into a quadrature analog signal and provide the quadrature analog signal to at least one of the first RF IQ mixer or the third RF IQ mixer; and
generating, using a first RF IQ mixer of the transmitter block, the fast frequency hopping output radar signal by mixing the inphase analog signal and the quadrature analog signal with the inphase RF local oscillator signal and the quadrature RF local oscillator signal for up-converting the inphase analog signal and the quadrature analog signal to RF frequencies, wherein the fast frequency hopping output radar signal is provided to a power amplifier to amplify the fast frequency hopping output radar signal to increase the magnitude of the fast frequency hopping output radar signal for wireless transmission using an antenna, wherein the fast frequency hopping output radar signal is provided to the local oscillator port of a second RF IQ mixer as the inphase local oscillator signal, wherein the receive RF IQ mixer is the second RF IQ mixer; and
a third RF IQ mixer that generates a mixed analog RF signal by mixing a 180 degree phase shifted inphase RF local oscillator signal and a quadrature RF local oscillator signal with the inphase analog signal and the quadrature analog signal from the inphase digital to analog converter and the quadrature digital to analog converter, wherein the mixed analog RF signal is provided to the second RF IQ mixer.

8. The method of claim 7, wherein the method comprises;
receiving, using the antenna, a reflected radar signal;
amplifying, using the low noise amplifier, the received radar signal;
mixing, using the second RF IQ mixer, the amplified radar signal with an output of the first RF IQ mixer and the third RF IQ mixer to obtain a down-converted signal at a baseband frequency;
filtering, using an inphase receive filter and a quadrature receive filter, a down converted signal;
converting, using an inphase analog to digital converter (ADC), a filtered signal into an inphase digital signal;
converting, using a quadrature analog to digital converter (ADC), a filtered signal into a quadrature digital signal; and
demodulating, using a second digital mixer, the digital in-phase signal and the digital quadrature signal into the digital data.

* * * * *